Figure 3:
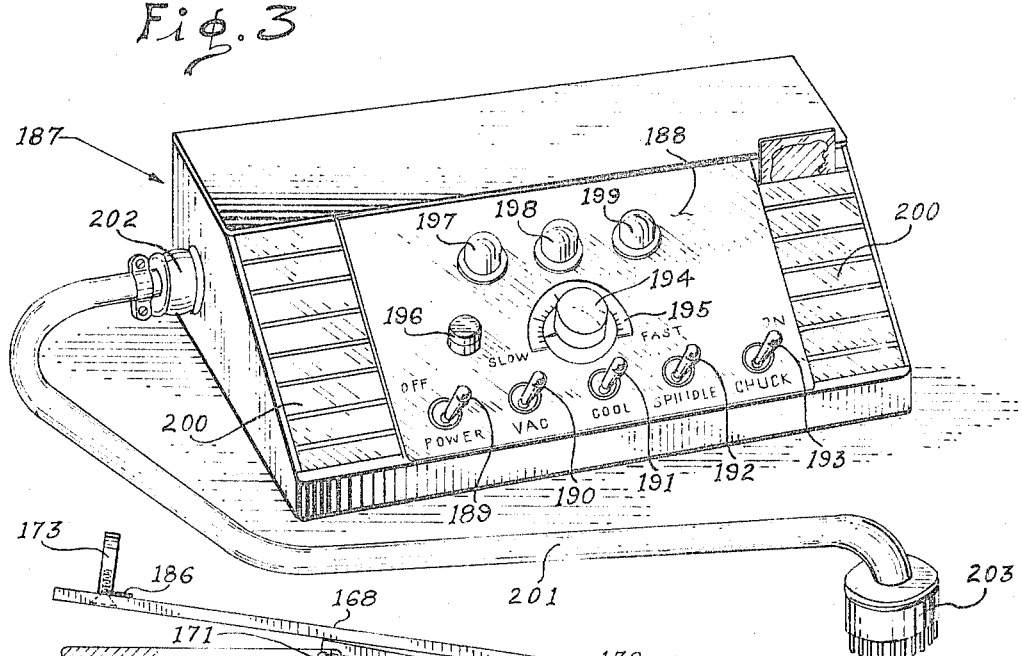

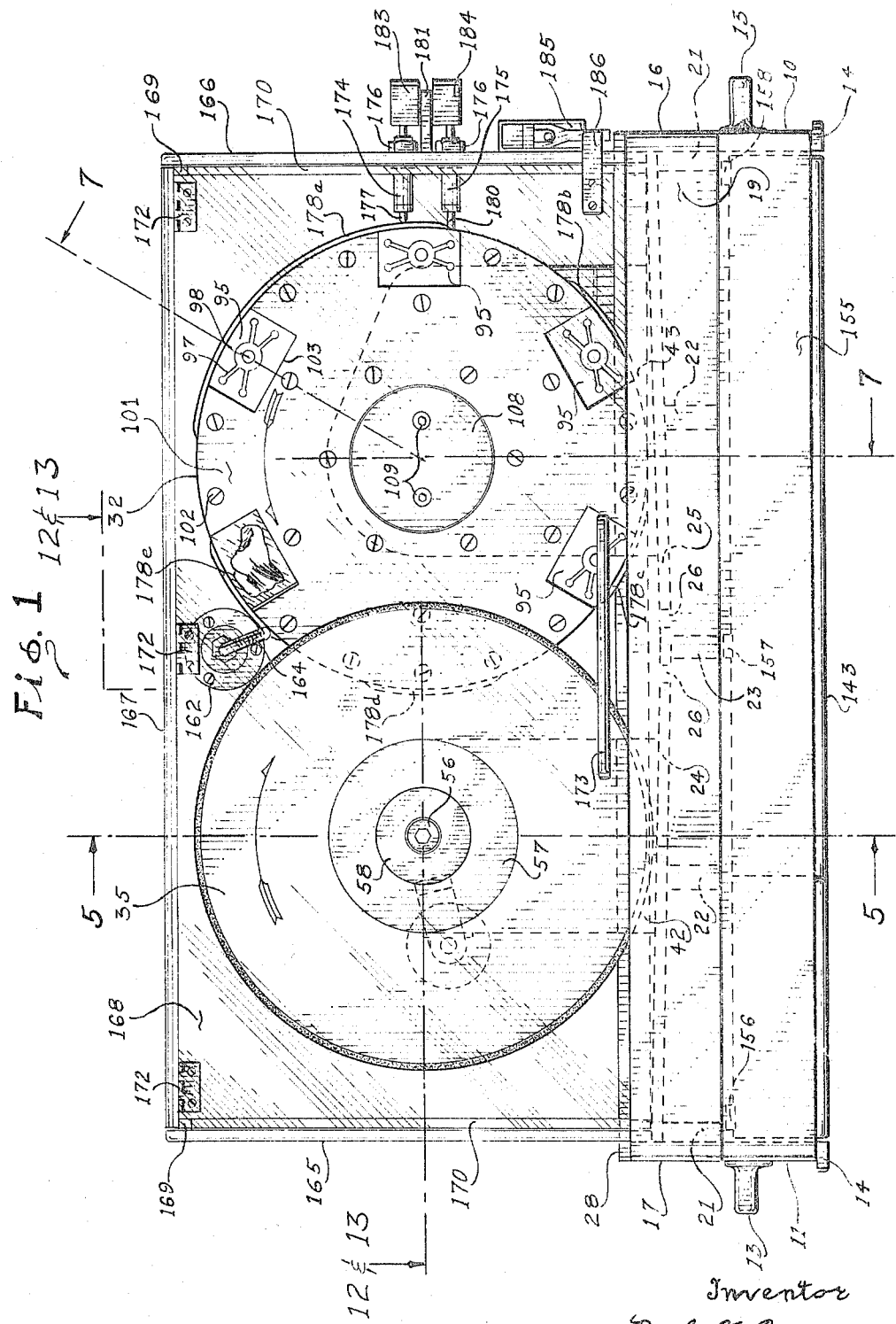

Inventor
Paul O. Cary

Inventor
Paul O. Cary

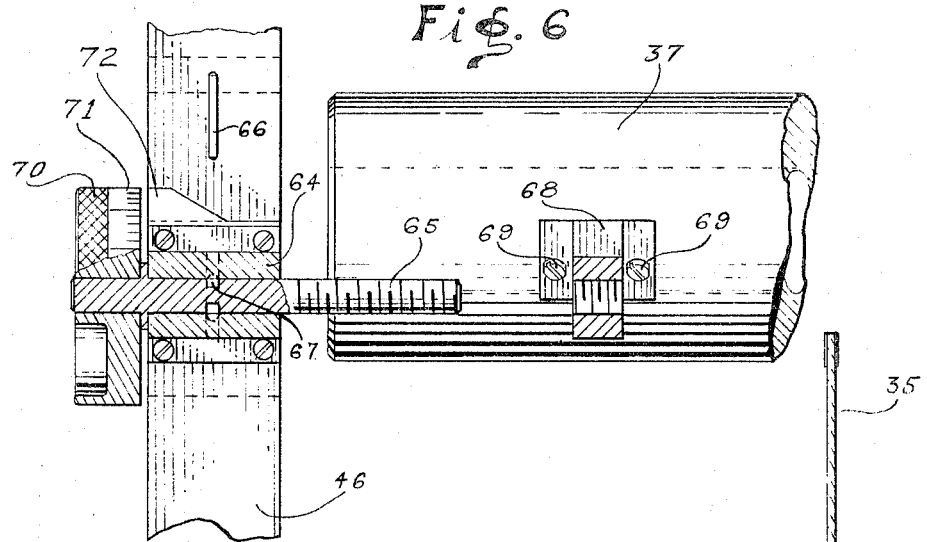
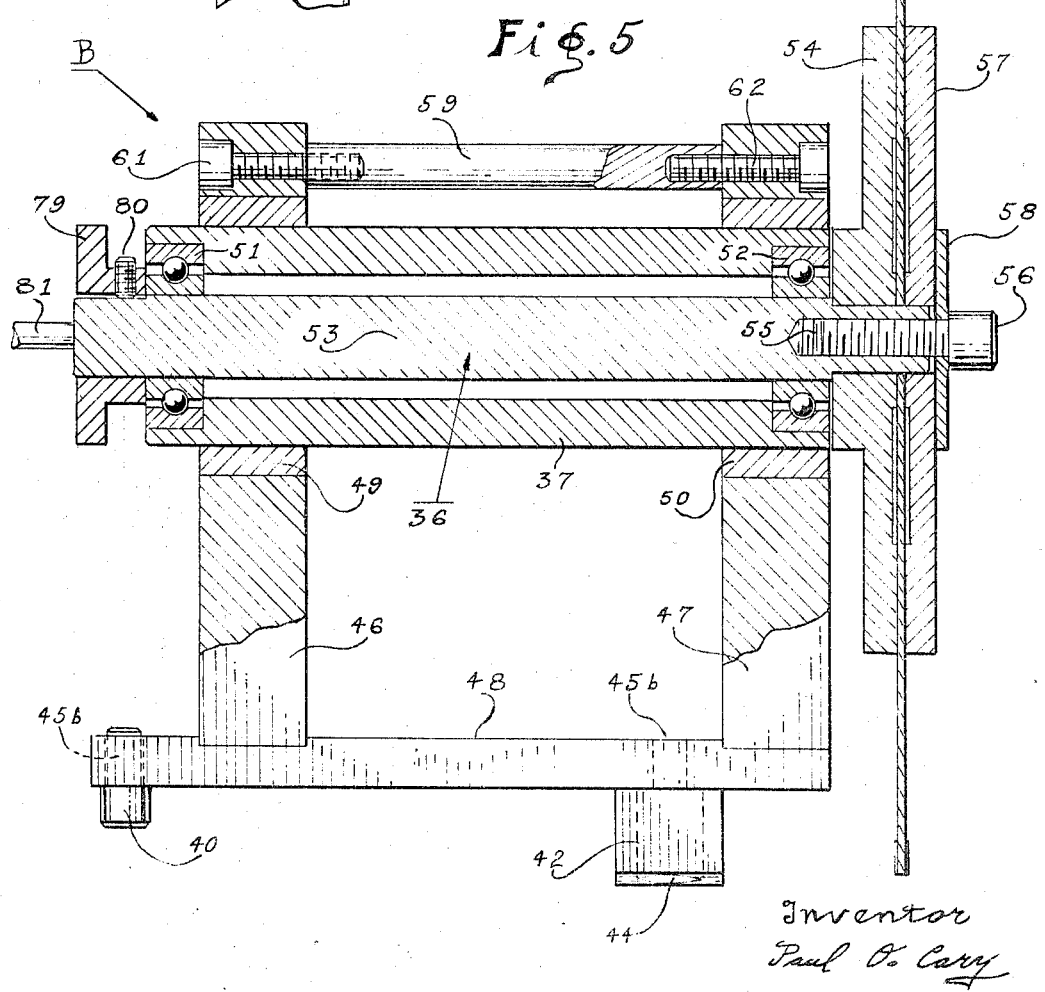

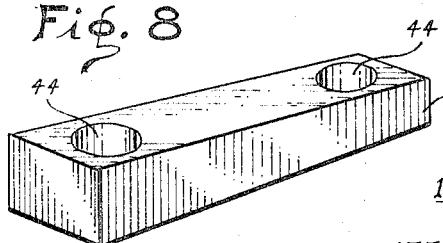
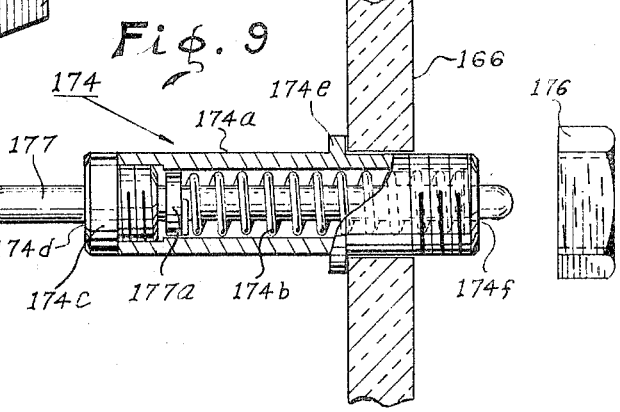
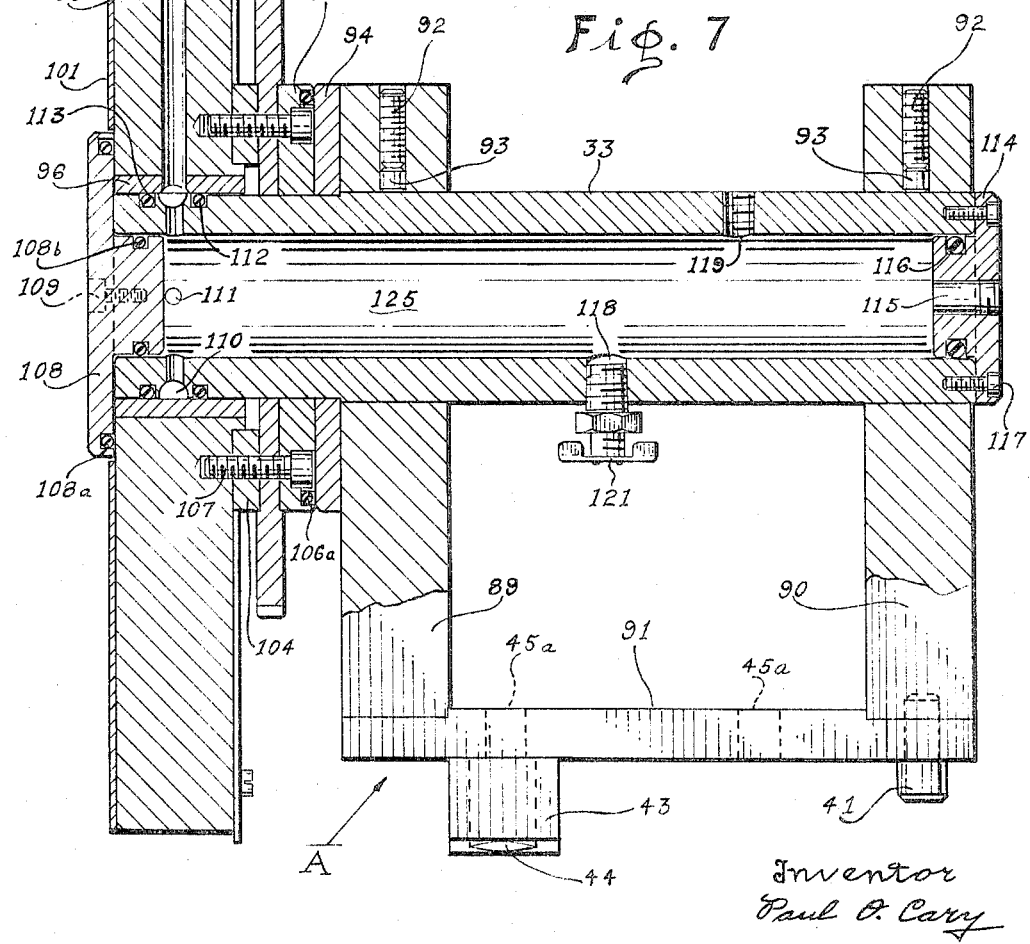

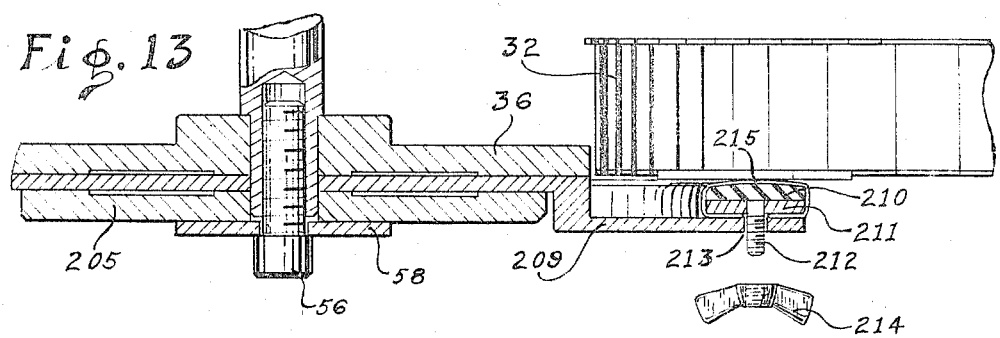
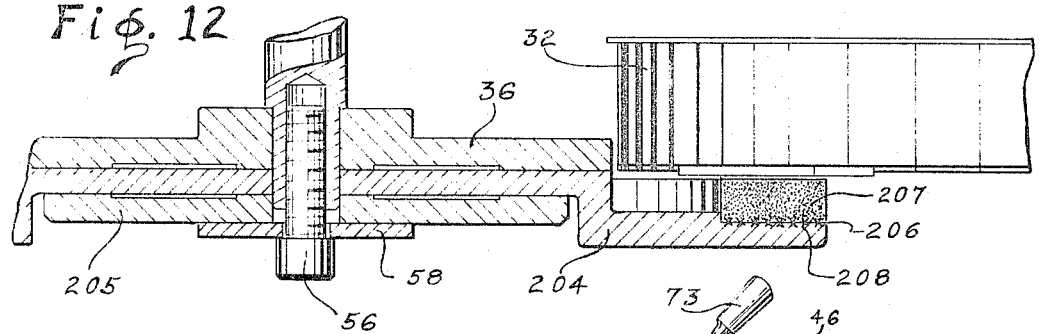
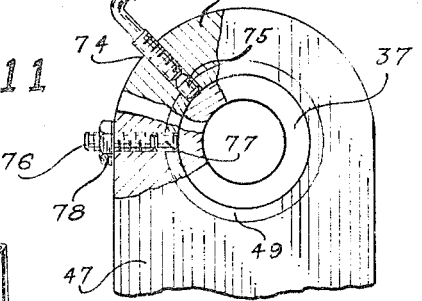
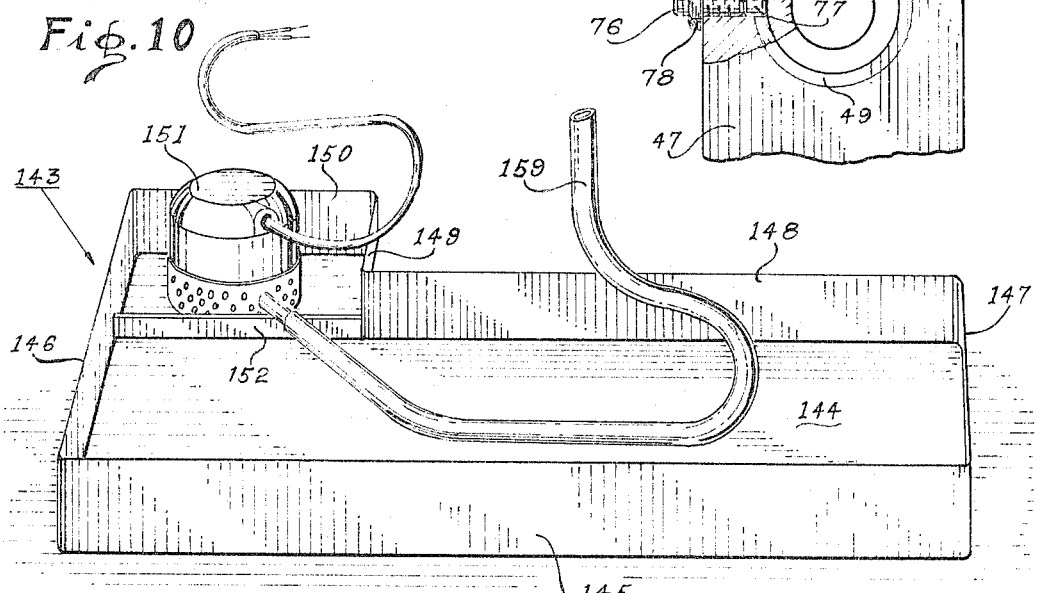

United States Patent Office 3,289,663
Patented Dec. 6, 1966

3,289,663
AUTOMATIC SECTIONING MACHINES
Paul O. Cary, 423 E. Mayfield Drive,
Grand Junction, Colo.
Filed July 3, 1964, Ser. No. 380,172
13 Claims. (Cl. 125—13)

This invention relates to machines used to process solid materials into precise cross-sections for analysis, quality control, and the production of products. The present invention as herein described and illustrated is particularly adapted for the processing of ore (rock material) into thin section analysis specimens, used by mineralogists and geologists to determine the mineral content and grain structure of any given sample.

These specimens which are precision mounted on a glass slide, are placed under a polarizing microscope and by analyzing the light wave band produced, mineral content can be determined.

Specimens used for the aforementioned purpose must possess certain physical characteristics which will render said specimens usefull. Said specimens must be very thin, usually about .0012" thick, and must lie in a plane as nearly parallel to the surface of the glass slide as possible. It is usually very desirable that the surface of such specimens be as smooth as possible and polishing is sometimes employed to obtain this feature.

The conventional way of producing such specimens, as heretofore practiced, is to clamp the rock, boulder, or lump from which the specimen is to be taken, in a large slabbing saw of a general nature and in wide use. A cut is taken through said rock to establish a flat surface, then the rock is reclamped and a second cut taken in order to slab off a piece that is from ⅛ to ⅜ of an inch thick, and that has two roughly parallel faces. From said piece, a specimen is cut that will suitably fit upon a glass slide.

The specimen is then placed upon a lapping plate and one side lapped to obtain a smooth, flat surface. Said lapped surface is then impregnated with a suitable bonding agent, such as a clear epoxy cement, and then bonded to the glass slide so that the flat surface of the glass, and the lapped surface of the specimen fit together as closely as possible in a plane.

The specimen, now mounted upon the slide, goes through subsequent trimming, lapping, and polishing operations in order to obtain the finished specimen. Said subsequent operations, as heretofore practiced, have involved the use of a different machine or device for each operation. For instance, a small slabbing saw for trimming, a lapping or grinding machine, and a polishing machine. Employing the means as heretofore practiced involves a great deal of operator time and skill as the specimens are, for the most part, clamped, trimmed, fed, lapped or ground, and polished by hand. Skill on the part of the operator is very important because the operator must correct any errors induced in prior operations.

Since specimens are usually worked through the above mentioned operations by hand and through different machines the heretofore practiced process does not lend itself very well when production of said specimens is in large quantities. The making of such specimens has been ever increasing, due to the search for more and better materials.

An object of the present invention, therefore, is to provide improved means by which thin section specimens can be produced on a larger-scale production basis.

A further important object of the present invention is to provide means for easily and accurately positioning a plurality of specimens on a chuck, and then securely holding them during the subsequent trimming, grinding, and polishing operations. The present invention also provides means by which one machine can be easily and precisely adjusted for the aforementioned operations regarding thickness of cut, rate of feed, and cooling of cutting area, and by being able to hold such precision, and by operating automatically will process specimens of uniform quality without the constant attention of a skilled operator.

Other advantages inherent in the present invention are; that it is easily portable, clean operating, easy to maintain, and safe to use.

Figure 2:
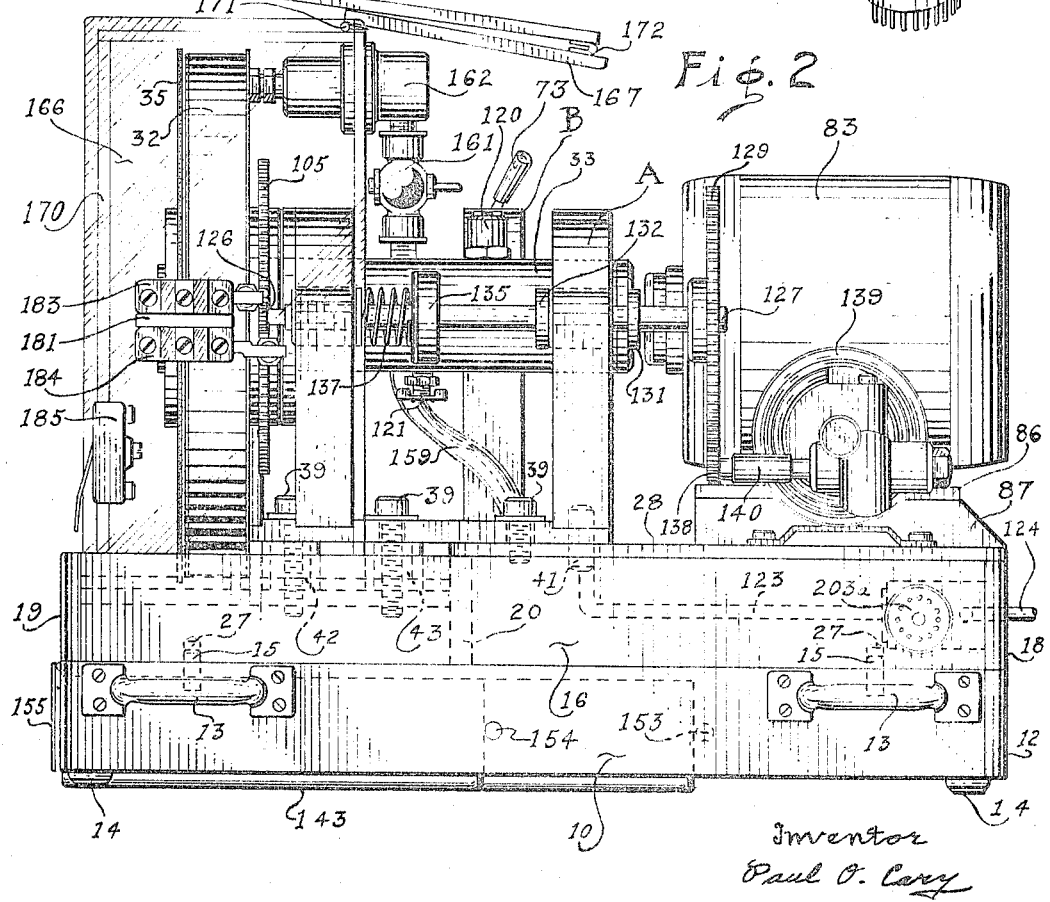
Figure 4:
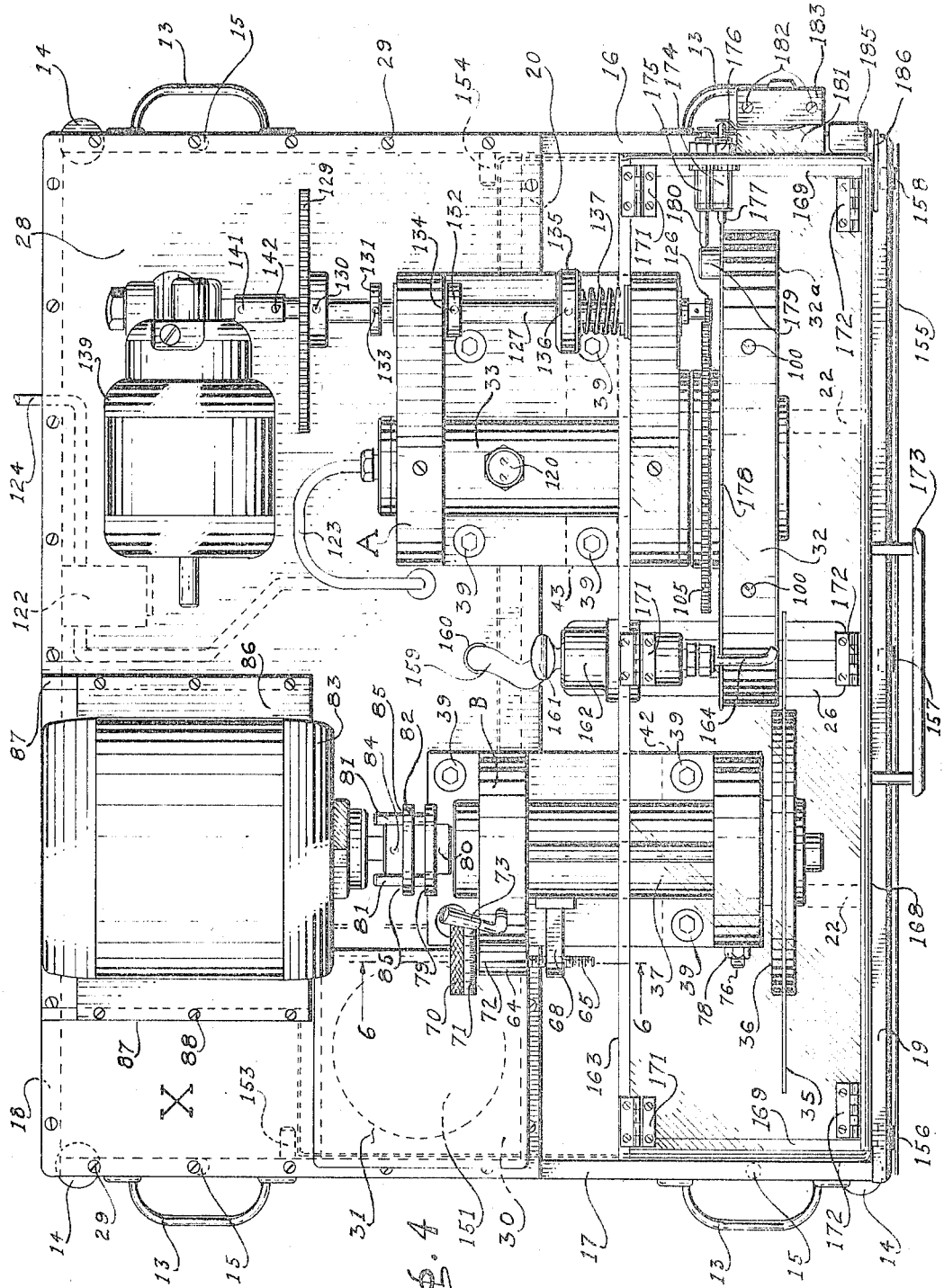

Although the novel features which are believed to be characteristic of the invention will be particularly pointed out in the claims appended hereto, the invention itself, as to its objects and advantages, and the manner in which it may be carried out, may be better understood by referring to the following description taken in connection with the accompanying drawings forming a part hereof, in which FIGURE 1 is a front view in elevation of the apparatus.
FIGURE 2 is a side view in elevation of the apparatus.
FIGURE 3 is a view in perspective of the control housing.
FIGURE 4 is a top plan view of the apparatus.
FIGURE 5 is a view in partial cross-section of the quill-frame assembly, taken on line 5—5 of FIGURE 1.
FIGURE 6 is an exploded view in partial cross-section of the micrometer adjust assembly, taken on line 6—6 of FIG. 4.
FIGURE 7 is a view in partial cross-section of the vacuum chuck-frame assembly, taken on line 7—7 of FIGURE 1.
FIGURE 8 is a view in perspective of a tapered wedge block.
FIGURE 9 is a view in partial cross-section of a switch actuator assembly.
FIGURE 10 is a view in perspective of the coolant tray and pump.
FIGURE 11 is a view in partial cross-section of the quill-frame arrangement, and the relationship of the lock screw and jib adjusting screw.
FIGURE 12 is a view in partial cross-section of the grinding plate and its relationship with the vacuum chuck taken on line 12—12 of FIGURE 1.
FIGURE 13 is a view in partial cross-section of the polishing plate and its relationship with the vacuum chuck, taken on line 13—13 of FIGURE 1.

To explain the principle of machines contemplated by this invention, certain specific apparatus is hereinafter described illustrating a preferred embodiment which has been constructed and made available to the trade. Various details are identified by specific names for convenience, but they are intended to be as generic in their application as the state of the art will permit. Like reference characters denote like parts in the several figures of the drawings.

Referring to FIGURES 1 and 2, a machine base subframe is provided by three frame members, side members 10 and 11 and the rear member 12. These aforementioned members are joined together to form the base sub-frame. Four handles 13 are fastened at the upper edge and near both ends of each side member 10 and 11, thus providing a handle near each corner of the machine base to facilitate the manual carrying of the machine from place to place.

Four rubber feet 14 are attached to the bottom edge of the sub-frame near each corner to provide a four point support for the machine. Said feet will compensate for any unevenness of surface the machine may be placed upon and at the same time resist slipping.

Four pins 15 are provided on the top edge of the base subframe members 10 and 11, the axes of pins 15 being perpendicular to the top surface of said members. The pins 15 are located on the center of each member's thickness and near the center of the handles 13, as shown in FIGURE 2.

Referring to FIGURES 1, 2 and 4, the machine base proper has two side members 16 and 17, one rear member 18, one front member 19, one cross member 20, two gusset members 21, two gusset members 22, and one gusset member 23. Upon gusset members 21, 22, and 23, and between cross member 20 and front member 19 are the drain floor panels 24 and 25 (shown in FIG. 1). Gusset members 21, 22, and 23 each decrease in width, and with the drain floor panels 24 and 25 fixed upon them as shown, results in a floor inclined downward to center, or in other words lower in elevation at the center over gusset member 23.

The drain floor panels 24 and 25 are provided with two elongated openings 26.

Referring to FIGURES 2 and 4, the side members 16 and 17 have two holes each, said holes 27 are located so they match with pins 15 in the base sub-frame, the holes 27 engage the pins 15 and insure and maintain proper alignment of the machine upon its sub-frame.

Referring to FIGURE 4, the deck 28 is fixed to the machine base members 16, 17, 18 and 20, by means of the screws 29, spaced around the deck edge at suitable intervals. The deck 28 is provided with an opening 30 over which is fitted a cover 31.

Referring to FIGURES 1 and 4, the vacuum chuck 32 is mounted for rotation about a horizontal axis in a counterclockwise direction (as indicated by the arrow) upon a tubular shaft 33. Tubular shaft 33 is mounted in the frame A.

The saw blade 35 is mounted for rotation about a horizontal axis, with the cutting edge of the blade rotating in a plane substantially parallel to the plane of rotation of the front face 32a of the chuck, and in front of, or adjacent to, the front face of the chuck 32. The direction of rotation of blade 35 being clockwise. The spindle assembly 36 is journaled for rotation in the quill 37. The quill 37 is slidably mounted in the frame B. The frame B maintains the axis of quill 37 in substantially the same horizontal plane as the axis of tubular shaft 33 and substantially parallel to the axis of tubular shaft 33; however, said frame B being located so as to be closer to the front of the machine than frame A, to facilitate the positioning of the saw blade 35 so that it will be in front of and overlapping the chuck 32.

Referring to FIGURES 2, 4, 5 and 7, frames A and B are both fixed to the deck 28 by a plurality of bolts 39. The bolts 39 pass through the bases of frames A and B, and thread into the deck 28. The pins 40 and 41 plug into closely fitting holes provided in the deck 28, and provide points about which the frames A and B may be moved in a horizontal plane in order to facilitate the axes of quill 37 and shaft 33 being brought into a substantially parallel relationship with one another. Holes 45a and 45b in the bases of frames A and B are larger than the bolts 39 in order to provide the necessary clearance for adjustment.

Referring to FIGURES 1, 2 and 8, between the bases of frames A and B, and the inclined drain floor panels 24 and 25, are the wedge blocks 42 and 43. Said blocks provide support for the front ends of frames A and B, and also provide means by which the front ends of frames A and B may be raised or lowered to facilitate the adjusting of quill 37 and tubular shaft 33 to substantially the same horizontal plane. Bolts 39 pass through the bases of frames A and B and the wedge blocks 42 and 43, said bolts being threadedly engaged in the drain floor panels 24 and 25. The hole 44 in blocks 42 and 43, through which the bolts 39 pass, is larger in diameter than the holes 45a and 45b and thereby facilitates the easy movement of the blocks for adjustment. Thus said bolts provide means for clamping the front ends of frames A and B, once adjustment is made.

Referring to FIGURE 5, the frame generally referred to by B, is comprised of plates 46 and 47 which are fixedly attached to the base 48. The similar faces of plates 46 and 47 are parallel to each other and are so fixed to base 48 as to be perpendicular to base 48. The plates 46 and 47 hold the bushings 49 and 50, the bushings 49 and 50 are precision bored to slidably fit the quill 37. The quill 37 contains ball bearings 51 and 52, said ball bearings provide means by which the spindle assembly 36 is rotatably journaled.

The spindle assembly, generally referred to by 36, is made up of two parts, the arbor 53 and the flange 54. The flange 54 is fixed near one end of the arbor 53 and provides a suitable mounting surface for the circular saw blade and other circular processing tools. The flange end of said spindle is provided with a threaded hole 55, which accepts the cap screw 56.

The saw blade 35 mounts on the arbor 53, against the flange 54, and is retained by the disc 57 and the washer 58. Tie rod 59 is connected between plates 46 and 47 to insure rigidity, and is fastened to plates 46 and 47 by screws 61 and 62.

Referring to FIGURE 6, fixed to plate 46 is a micrometer adjust body 64, the body 64 retains a rotatable screw member 65, by means of a pin 66. Said screw 65 has a groove 67 which works in conjunction with pin 66 in retainment of the screw 65. Groove 67 extends around the circumference of screw 65 and is concentric with the axis of screw 65. Screw 65 threads into and engages the arm 68, said arm 68 is fixed to the quill 37 by means of the screws 69. A knurled dial 70 is fixed to one end of screw 65, said dial has suitable graduations 71 engraved around its circumference. Pointer 72 is fixed to the body 64. It can be seen that if the dial 70 is turned, the screw 65 when engaged with arm 68 will move the quill 37 back and forth by means of the connecting arm 68. The aforementioned movement is along an axis that is substantially parallel and in the same plane as the axis of tubular shaft 33. The arm 68 has another important function which is to keep quill 37 from rotating.

Referring to FIGURES 4 and 11, lock screw 73 provides means of locking the quill 37, once adjustment is made. As shown in FIGURE 11, the lock screw 73 threads into plate 46 by means of threaded hole 74 which passes through the plate 46 to the quill 37. Between screw 73 and quill 37 is the brass pad 75. It can be seen that the screw 73 can force pad 75 against quill 37 with sufficient pressure to clamp quill 37. The pad 75 prevents the marring of the surface of the quill 37.

Jib screw 76 and pad 77 are provided to keep play between the bushing 49 and the quill 37 at a minimum, and to provide an adjustment for wear. The jib screw 76 threads into plate 47. Brass pad 77 is located between jib screw 76 and quill 37. The lock nut 78 insures any adjustment made will be retained.

Referring to FIGURE 4, spindle coupling 79 is fixed to the spindle assembly 36 by the set screw 80. Spindle coupling 79 carries two driving pins 81 which are secured by a press fit to coupling 79. Motor coupling 82 is fixed to the shaft of motor 83 by set screw 84. Two driver holes 85 are provided in coupling 82, said holes being located in coupling 82, so that they match with the driver pins 81 when both couplings are concentric about the same axis. Driver holes 85 are of a larger diameter than the drive pins 81 to provide suitable clearance for free running and to enable the drive pins 81 to move in and out of said holes 85 in a direction parallel to the axis of quill 37, and at the same time provide a driving connection between the shaft of motor 83 and the spindle assembly 36.

As can be seen from the aforementioned description, the removal of the quill 37 may be easily accomplished by loosening lock screw 73 and turning micrometer adjust dial 70 until screw 65 disengages from arm 68. The screws 69, which hold arm 68 to quill 37, are removed; then quill 37 can be removed from the frame B by pulling quill 37 out toward the front of the machine.

Motor 83 is mounted on plate 86, which is fastened to struts 87 by means of the screws 88. The struts 87 are fixed to the deck 28. The struts 87 and the plate 86 provide a motor mounting surface for motor 83, which will enable motor 83 to be positioned and fixed in such a way, that the motor shaft is in line with the axis of spindle 36.

From the aforementioned description it can be seen that means are provided in the present invention for the accurate positioning and adjustment of the saw blade 35 in relation to the vacuum chuck 32, and that means are provided to maintain said adjustment once it is made.

Referring to FIGURE 7, the frame-assembly, generally referred to as A is comprised of plates 89 and 90 which are fixedly attached to the base 91. The similar faces of plates 89 and 90 are parallel to each other and are so fixed to base 91 as to be perpendicular to base 91.

The tubular shaft 33 is mounted in the plates 89 and 90 and is retained by means of screws 92 and brass pads 93. Fixed to the tubular shaft 33 is the bearing flange 94.

Referring to FIGURES 1 and 7, it can be seen in FIGURE 1, the vacuum chuck 32 provides five recessed areas 95, which are located upon the front face 32a of chuck 32 and near the perimeter of the chuck face at intervals so spaced as to provide an area that is void of such recesses; the said void area being large enough to fill the part of the face of the chuck 32 that is covered by the saw blade 35. In FIGURE 1 the said void area is shown directly behind the saw blade 35. This void area has a very important function in that it permits the chuck to be rotated to a position where all recessed areas are cleared of the overlap of the saw blade 35. Since these recessed areas are used to hold the specimens, this feature facilitates the loading and unloading of specimens. Although five recessed areas are shown, it is apparent that more could be added up to a point, and by placing them closer together the aforementioned void area can be retained. The front face 32a of the chuck rotates in a plane substantially parallel to the plane of rotation of the cutting edge of saw blade 35.

Referring to FIGURE 7, the chuck is provided with a bronze bushing 96, said bushing 96 is fixed to chuck 32, and precision bored for rotatable movement around tubular shaft 33; said rotation being in a plane perpendicular to the axis of tubular shaft 33.

Each of the recesses 95 is provided with suitable vacuum grooves 97 which connect to ports 98. Ports 98 provide a connection between the grooves 97 and the holes 99, which are drilled from the outer edge of the chuck toward the center of the chuck. Said holes pass through bushing 96, and are so located in the chuck as to provide one for each recess. Each of the holes 99 is threaded at the periphery of the chuck and is provided with screw plugs 100 (shown in FIG. 4).

Mask 101 is fixed to the front face of chuck 32 by means of a plurality of screws 102, suitably located so mask 101 fits tightly to the front face of chuck 32. This mask 101 is provided with a number of cut out openings 103 that generally conform to the three sides of a rectangular glass slide. These openings 103 match up with the locations of grooves 97 and the ports 98 on the front face 32a of the chuck 32, and when said mask is fixed upon the chuck 32 (FIG. 1), provides a plurality of recessed areas defined by the three sides of the openings 103. Said openings 103 not only define a recessed area but also confine the specimen to the recessed area during the processing of the specimens. The grooves 97 and the ports 98 lie within the area defined by the sides of openings 103. (FIG. 1 shows a specimen mounted in one of the recesses.)

Concentrically fixed to the back of chuck 32, are the adaptor ring 104, gear 105, and the bearing face 106 which contains seal 106a, all interlockingly fitted and retained by means of a plurality of evenly spaced cap screws 107 (two of which are shown in FIG. 7). Bearing face 106 provides a thrust bearing face against flange 94 and also works with bushing 96 in providing bearing surface upon tubular shaft 33.

Chuck 32 is retained on tubular shaft 33 by means of cap 108 and screws 109. When cap 108 is in place, a suitable clearance exists between the chuck 32 and cap 108 enabling chuck 32 to rotate freely with a minimum of end play. Cap 108 is provided with O-ring seals 108a and 108b. It can be seen that the chuck 32 can be easily removed from the machine by removing the cap 108.

Tubular shaft 33 is provided with groove 110 which extends around the full circumference of shaft 33 and which lines up with holes 99 provided in the chuck 32. Groove 110 is provided with a plurality of ports 111, said ports being equally spaced around the groove 110 and running into the bore 125 of the tubular shaft 33. Tubular shaft 33 is also provided with two O-ring seals 112 and 113, one on either side of groove 110.

The end of tubular shaft 33 opposite chuck 32 is fitted with cap 114 which is provided with a pipe threaded port 115, the cap 114 is also fitted with seal 116. Cap 114 is fixed to the shaft 33 by means of screws 117.

The tubular shaft 33 is provided with ports 118 and 119 which are used to connect vacuum switch 120, and valve 121, both of which are shown in FIG. 2. Valve 121 is used to drain tubular shaft 33 if it becomes necessary. Solenoid valve 122 is mounted on machine base member 18 (as shown in FIG. 4). Valve 122 is connected to tubular shaft 33 by means of tubing 123. Tube 124 emerges from member 18 and is used to connect the machine to a vacuum source. Tube 124 passes through base member 18 and provides connection to valve 122.

It can be seen that if ports 119 and 118 be closed, and a condition of vacuum applied at port 115, vacuum or suction is applied at each recess area upon the face of the chuck 32. The vacuum condition runs from grooves 97, through ports 98, through holes 99, to groove 110, through ports 111, into the tubular shaft bore 125, to port 115. With a glass slide placed upon all recesses, a closed vacuum system exists whereby sufficient suction is applied to said glass slides to firmly hold them upon the face of chuck 32.

Removal of tubular shaft 33 may be easily accomplished by loosening retaining screws 92, and by the removal of the vacuum switch 120, valve 121, and cap 114. Shaft 33 can then be slipped out of frame assembly A by pulling said shaft 33 out toward the front of the machine.

Referring to FIGURES 2 and 4, a small spur gear 126 is shown engaging large gear 105. Gear 126 is fixed to shaft 127 by a pin. At the opposite end of shaft 127 is fixed large gear 129 which is fixed to shaft 127 by pin 130. Shaft 127 is journaled for rotation about a horizontal axis and in the same horizontal plane as tubular shaft 33. The axis of shaft 127 is spaced at a distance from the axis of tubular shaft 33 so as to provide a correct running clearance between gear 126 and gear 105.

Shaft 127 is fitted with thrust collars 131 and 132, said collars being fixed in place by pins 133 and 134. These collars are so placed upon shaft 127 that they control the longitudinal displacement of shaft 127, and provide stops used in engaging and disengaging gear 126 from gear 105. With shaft 127 held in the forward position gear 126 is then positioned in the space between gear 105 and the back face of the chuck 32, and the chuck may then be rotated to any position desired. If shaft 127 is then moved toward the rear of the machine, gear 126 will slip into engagement with gear 105 and provide a driving relationship. Shifting collar 135 is shown fixed to shaft 127 by pin 136 and provides a convenient means with which to move shaft 127 forward by hand. A compression spring 137 is provided between shift collar 135 and plate 89 of the frame assembly A. Means are thusly effected to normally hold gear 126 in engagement with gear 105 during running operation.

As can be seen in FIGURES 2 and 4, large gear 129 is in running engagement with small gear 138, which is fixed to the shaft of motor 139 by means of adaptor 140, and set screws 141 and 142. It is pointed out that gear 126 has narrower teeth than gear 138, so that when shaft 127 is shifted forward to the point determined by collar 131, and where gear 126 disengages, gear 138 will still have a a small amount of tooth contact with gear 129. Thus when gear 126 is disengaged by moving shaft 127 forward, gears 129 and 138 still remain engaged. Driving power is supplied to the aforementioned gear train arrangement by an adjustable speed gearmotor 139, which is fixedly mounted on deck 28. When motor 139 is in a running state, small gear drives large gear 129, thus affecting a speed reduction at shaft 127. With small gear 126 connected to shaft 127, and driving large gear 105, a further speed reduction occurs, gear 105 being fixed to the chuck 32.

It is apparent from the aforementioned description that a disengageable gear train is provided that will drive chuck 32 at a very slow rate of speed from motor 139, and since motor 139 is an adjustable speed motor, the desired rate of speed can be adjusted very precisely.

Referring to FIGURE 10, the coolant tray, generally referred to by 143, consists of floor 144, front wall 145, side walls 146 and 147, rear wall 148, and sump walls 149 and 150. The coolant pump 151 is located in the sump area confined by upstanding walls 146, 149, and 150, and baffle 152. Coolant tray 143 is shown in its operating position in FIGS. 1 and 2, said tray being placed under the machine base so that the front wall 145 of the tray is in line with machine base member 19, and so the sump area confined by walls 146 and 149 and 150 is directly below the opening 30 in the deck 28 (FIG. 4). Stop pins 153 and 154 contact rear wall 148 and sump wall 150 of tray 143, and stop the tray in its correct position. Door 155 is swingingly attached to base member 19 by hinges 156, 157, and 158, and acts as a cover for tray 143.

This aforementioned arrangement provides for easy removal of the tray for cleaning. To remove the tray, cover 31 is removed and pump 151 is lifted from the tray and placed in the area on the deck denoted by the letter "X." The hinged door 155 is lifted to a horizontal position and tray 143 is pulled out.

A suitable hose 159 is connected to pump 151 and runs from the pump through hole 160 in deck 28, to the valve 161. The valve is connected to fitting 162, which is fixedly mounted on coolant shield back 163. A flexible nozzle tube 164 is connected to fitting 162. As is shown in FIGS. 1 and 4, the flexible nozzle 164 is located in a position directly above the machine cutting area.

When the coolant system is in operation the pump 151 picks up coolant from the sump area, located in the tray 143, and forces it through hose 159 to valve 161, where the rate of flow can be controlled. From valve 161 the coolant moves through fitting 162, to nozzle 164. The coolant floods the processing area and drains down to the coolant drain floor, said floor having upstanding walls formed by base members 16, 17, 19 and 20. Since the drain floor is lower in elevation at the center of the machine, coolant runs toward the two elongated openings 26. The coolant drains through said openings to the tray 143, where almost all sediment settles out and the baffle 152 allows only clean coolant to reach the sump area.

Referring to FIGURES 1, 2 and 4, during operation coolant is confined to the machine by a coolant shield, said shield being made of clear Plexiglas material. This shield consists of back 163, sides 165 and 166, top 167, front 168, top baffle 169, and front baffles 170 (FIGS. 1 and 4). The shield top 167 is attached to shield back 163 by three hinges 171, the shield front 168 is attached to the shield top 167 by three hinges 172. With the shield front and top so hinged, the shield is provided with a double folding door that can be folded up and over shield back 163 (FIG. 2). Shield front 168 is provided with a suitable handle 173. With the shield door opened thus, the entire front area of the machine is available, facilitating the easy loading and unloading of specimens. When the shield is shut and the machine is in operation, coolant is efficiently confined to the working area, keeping the surrounding area neat and clean.

Referring to FIGURES 1, 2 and 4, fixedly attached to coolant shield side 166 are the switch actuators 174 and 175, said actuators are mounted through holes provided in shield side 166 and retained by nuts 176. As can be seen in FIG. 9, the actuator 174 has a housing 174a, said housing being bored to accept the spring 174b and the rod 177 with its flange 177a.

The spring and rod are retained by cap 174c, said cap possesses a hole 174d that closely fits the diameter of rod 177. The housing 174a has a flange 174e that fits against the shield side 166. The portion of the housing 174a that emerges from the shield side 166 is threaded to accept nut 176, and is provided with hole 174f that closely fits rod 177. Thus actuator 174 provides means for spring loading of rod 177. The construction of actuator 175 is identical to actuator 174 except that rod 180 is longer, as compared in FIG. 9.

Actuator 174 is so positioned that the actuator rod 177 lines up with, and runs against, cam ring 178, said cam ring 178 has cam lobes 178a, 178b, 178c, 178d and 178e (as shown in FIG. 1). Since rod 177 rides on the edge of cam 178, the rise and fall of the cam lobes will impart a longitudinal movement to rod 177.

Actuator 175 is so arranged that it is perpendicular to the axis of disc 179, and when rod 180 is contacted by the outer diameter of said disc, rod 180 will ride up on said diameter imparting a longitudinal movement of rod 180.

Centered between actuator 174 and actuator 175 in a horizontal plane, is a Plexiglas plate 181 which is fixedly attached to shield side 166. Mounted on each side of plate by screws 182, are micro switches 183 and 184, said micro switches positioned so the longitudinal movement of rods 177 and 180 can actuate said switches 183 and 184.

As shown in FIGURES 1 and 2, a third micro switch 185 is positioned on shield side 166, below switches 183 and 184, and near the front edge of side 166. Attached near to the lower edge of the shield front 168, and on the same side of the machine as micro switch 185, is the switch actuator 186. The relative position of switch 185 and actuator 186 are such that when the coolant shield is closed, actuator 186 closes switch 185.

Shown in FIGURE 3 is the control housing 187 which contains a commercially available electronic motor control, and the wiring to the various switches. Upon control panel 188 are suitably located the main power circuit switch 189, vacuum switch 190, coolant pump switch 191, spindle switch 192, and chuck feed switch 193, all said switches being on a horizontal line in the lower part of the panel 188.

Above the switch line and in the center of the panel, is the feed control dial 194, which works in conjunction with a graduated scale plate 195. The dial 194 is attached to, and regulates, a potentiometer, said potentiometer being part of a commercially available motor control. A fuse cartridge 196 is provided on the panel to facilitate the replacement of fuses. Above the dial 194, is a line of three indicator lights; power circuit light 197, vacuum light 198, and feed motor light 199. On both sides of panel 188, there is a specimen file 200 where reference specimens may be kept.

Cable 201 is provided with plugs 202 and 203 at both ends, with which the control housing 187 can be connected to the machine at socket 203a.

FIGURE 12 is a grinding plate that can easily replace saw blade 35. The grinding operation is performed after the trimming operation, to further reduce specimens thickness and to insure a surface that has a plane parallel to the glass slide. The mounting plate 204 mounts on the spindle assembly 36 and is retained by disc 205, washer 58, and cap screw 56. The mounting plate 204 has a suitable face 206 for the mounting of the abrasive 207, said abrasive is fixed to the plate 204 by cement 208.

FIGURE 13 is a polishing plate, that is easily mounted on the spindle assembly 36. The mounting plate 209 mounts on the spindle assembly 36 in the same way as the grinding plate shown in FIG. 12. A rubber pad 210 is bonded to a metal mounting ring 211; fixed to the ring 211 is a plurality of studs 212, which are evenly spaced around the ring 211 on a bolt circle that is centered between the outside and inside diameters of the ring, the axis of studs 212 being perpendicular to the face of the ring 211.

The holes 213 are located on mounting plate 209 on the same bolt circle diameter as the studs 212, this bolt circle is concentric with the axis of spindle 36, and the holes 213 match up with the studs 212 so that the ring 211 may be mounted on plate 209 and retained by a plurality of wing nuts 214. The pad 210 is covered with a suitable cloth material 215 which is pulled around and in back of the metal ring 211, where it is cemented in place, and when the buffing ring (so fabricated) is mounted on the plate 209, the cloth 215 is firmly clamped between ring 211 and plate 209. During the polishing operation the cloth cover 215 is charged with a suitable diamond polishing compound, and buffing pressure can be set by means of the micrometer adjust dial 70.

It can be seen that a number of buffing rings can be made up and charged with different compounds, this is an important feature since there are a great number of polishing compounds and cloths available to the trade, and they each have their particular advantages in relation to a particular type of specimen being worked.

*Operation*

The main power circuit switch 189 is flipped to the on position and the indicator light 197 will glow. The coolant shield is then opened and the vacuum switch 190 is flipped on. With switch 190 in the on position, solenoid valve 122 opens and vacuum is supplied to the chuck face. Only the vacuum switch will energize with the coolant shield open, all other controls are locked out by means of micro switch 185. After a specimen is placed in each chuck recess, the vacuum system is then in a closed condition and the vacuum quickly rises to the safe zone. The vacuum switch 120 is actuated by sufficient vacuum in the system, and indicator light 198 on the control panel will light. The coolant shield is then closed, thus closing micro switch 185. Lock screw 73 is released and the micrometer adjust dial is set for the desired thickness of cut, by means of graduations 71 and pointer 72, then lock screw 73 is tightened to maintain the setting, and coolant switch 191 is flipped to the on position. The coolant pump is thus put in an operating condition and coolant is delivered through hose 159 to valve 161, where the rate of flow can be set. The switch 192 is then flipped on, said switch energizing motor 83 which, through couplings 82 and 79, sets the processing tool into operation. The feed rate dial 194 is then set for the desired rate of feed and the chuck feeding switch 193 is flipped on, thereby energizing the adjustable speed gear motor 139, the feed light 199 will then glow. Said gear motor supplies rotational power to the chuck by means of the gear train. The gear motor 139 will operate at its top rate of speed until the first recess area 95 is 1/16" away from the processing tool, up to this point, micro switch 183 has been closed by means of lobe 178a. With the micro switch 183 in said closed condition, full voltage is shunted across the potentiometer controlled by dial 194. When the recess area is 1/16" away from the processing tool, micro switch 183 opens because of the drop of lobe 178a, and voltage can only pass through the potentiometer, hence the motor now operates at the pre-set speed.

When the saw blade 35 has passed the first recess area, the micro switch is closed by means of cam lobe 178b and actuator rod 177, again supplying full voltage to gear motor 139. The micro switch 183 continues to operate in this fashion until the last specimen is cut. When the last recess area has passed the cutting edge of the saw, the micro switch 183 is closed and the chuck is driven at full speed, by reason of long cam lobe 178a, until the blank area of the chuck is centered behind the saw blade 35, at this point micro switch 184 is opened by means of rod 180 and disc 179. When micro switch 184 is in an open state, the main power circuit is broken, automatically shutting machine off.

As can be seen from the aforementioned description, once the specimens are loaded into the machine and the settings made, the machine will then automatically process all samples unattended and shut itself off. When a chuck load of specimens is finished, the coolant shield is opened and the gear train disengaged from the chuck, and the chuck advanced just far enough for disc 179 to move and let micro switch 184 close again. The chuck is then loaded with new specimens and the cycle automatically begins again by closing the coolant shield. Prior to processing a partial chuckload of specimens the chuck may be disengaged from its gear train and then positioned so said specimens will not have to travel an undue distance to become processed. When a partial chuckload of specimens is processed a glass slide is provided for the recesses not carrying specimens.

Since the present invention has an adjustable feeding system the feeding rate may be adjusted to suit the feeding requirements of different types of processing tools and materials to be processed, and time is saved by the feed rate being automatically increased when the processing tool is not being applied to a specimen. The utility of the present invention is further increased by providing for the easy removal of the chuck, cam ring, and gear as a unit from the tubular shaft and thus allowing the mounting on the tubular shaft of chucks that are similar to the aforementioned chuck and thereby providing means for automatically processing a wide variety of workpiece types.

While the aforementioned description has for the most part presented the present invention in regards to the trimming operation of thin section specimens, employing the saw blade, the operation of the present invention for the grinding and polishing operations involves only the changing of saw blade to the grinding plate or polishing plate, and then setting the machine with the controls aforementioned.

A further important feature of the present invention is that said grinding plate may be employed to correct any small amount of longitudinal runout the front face of said chuck might have at the recessed areas. It can be seen that the mask 101 may be removed and the machine adjusted to automatically dress the part of the chuck face that includes said recessed areas, with said chuck dressed in such a manner the working surface of all processing tools will rotate in a plane extremely parallel to the portion of the chuck face that includes said recessed areas, and thereby provides means for producing workpieces with two faces that are extremely parallel.

While certain novel features of the present invention have been disclosed and are pointed out in the annexed claims, it will be understood that variations, omissions, substitutions and changes may be made by those skilled in the art without departing from the spirit of the invention.

What is claimed is:

1. Apparatus for processing solid material into precise cross-sections, said apparatus comprising a chuck mounted for rotation about a horizontal axis on a stationary tubular shaft, said chuck having a face upon which are distributed a series of recesses, said recesses being located near the periphery of said chuck face and providing means for positioning and holding one or more workpieces upon said chuck face, said recesses being so distributed as to provide said chuck face with an area void of said recesses, a solenoid valve to turn on and off a condition of vacuum at said recesses, a gear fixed to said chuck and engaged with a smaller gear fixed to the end of a transmission shaft mounted for rotation so that the axis of said transmission shaft is parallel to said tubular shaft and with said transmission shaft longitudinally movable, means with which to disengage said transmission shaft from the chuck and permitting said chuck to be rotated freely by hand, means to force said transmission shaft in a direction where the said transmission shaft is normally held in driving engagement with the gear fixed to said chuck, an adjustable speed gearmotor engaged with said transmission shaft in order to supply rotational power to said chuck, a frame A for mounting said tubular shaft and said transmission shaft to a base, said base consisting of a deck and an inclined drain floor, a frame B for mounting a longitudinally movable quill so the axis of said quill is substantially parallel and in the same plane as the axis of said tubular shaft, dual wedge blocks working in conjunction with said inclined drain floor in order to facilitate the adjusting of the relative positions of the axes of said quill and tubular shaft, said wedge blocks located between said frames A and B and said inclined drain floor and thereby facilitating the clamping of said frame A and frame B to said base, a screw mounted for rotation to frame B so that frame B retains said screw longitudinally and so the axis of said screw is adjacent and parallel to the axis of said quill, an arm fixed to said quill so the axis of said arm is perpendicular to the axis of said quill, said arm being threadingly engaged with said rotatable screw and thereby preventing the rotation of said quill in the frame B, means for rotating said screw a predetermined amount and thereby providing means for precisely adjusting the longitudinal displacement of said quill, a spindle journaled for rotation in said quill and retained longitudinally by the quill, means for rotationally driving a longitudinally movable spindle from a longitudinally stationary motor shaft, a circular processing tool mounted upon said spindle and positioned so the working surface of said processing tool will rotate in a plane substantially adjacent and parallel to the plane of rotation of the aforementioned chuck face and so the working surface of said processing tool overlaps said chuck face so that all said recesses may be overlapped by the working surface of said processing tool when said chuck is rotated, means for clearing all said recesses from the overlap of said processing tool, said clearing means being the positioning of the aforementioned void area on said chuck face so that it is evenly overlapped by said processing tool, a recirculating coolant system comprising a withdrawable coolant tray positioned under said base, a pump positioned in said tray, elongated openings provided in said drain floor at its lowest elevation and an opening in the deck of said base for removing said pump from said tray, a transparent shield with a double folding door enclosing said processing tool and said chuck and means operating therewith to permit said processing tool, gearmotor, and pump to operate only when said door is closed, a cam ring fixed to said chuck and working in conjunction with an actuator and switch for automatically increasing the speed of the gearmotor when said processing tool is not being applied to a workpiece, said cam ring also providing means for automatically positioning said void area on said chuck face for the clearing of all processed workpieces from the overlap of the processing tool, a cam disc for automatically stopping the operation of said processing tool, gearmotor, pump, and solenoid valve when all processed workpieces are cleared of said processing tool and when the said void area on the chuck face is evenly overlapped by said processing tool, thereby facilitating the loading and unloading of the chuck with workpieces, means for removing said chuck, cam ring, and gear as a unit from said tubular shaft and permitting the mounting on the tubular shaft of chucks that are similar to the aforementioned chuck, means for remotely housing the controls associated with the operation of said processing tool, gearmotor, pump and solenoid valve and with said housing having a control panel located between means for holding reference workpieces that are mounted on glass slides.

2. Apparatus defined in claim 1, the said processing tool being a grinding plate of the character described, said grinding plate providing means with which to correct any longitudinal deviation said chuck face may have at the recessed areas from the normal plane of rotation of said chuck.

3. Apparatus defined in claim 1, the said processing tool being a circular saw blade.

4. Apparatus defined in claim 1, the said processing tool being a polishing plate of the character described, comprising a rubber padded buffing ring and a mounting plate, means for removing said buffing ring from the mounting plate and thereby permitting the mounting on said mounting plate of similar buffing rings that are charged with different grades of abrasive.

5. The combination of a chuck mounted for rotation about an axis upon a stationary tubular shaft, said chuck having a face that has a plurality of recesses for gripping one or more workpieces, an area on the chuck face void of said gripping recesses, means to vacuumize said recesses, a spindle journaled for rotation in a quill, a frame A for mounting said tubular shaft to a base, said base comprising a deck and an inclined drain floor, a frame B for mounting said quill to the base so the quill is longitudinally movable in said frame B, means for mounting the frame A and the frame B to the base so that a processing tool mounted on said spindle will rotate in a plane overlapping and substantially parallel to the plane of rotation of said chuck face, said mounting means including wedge blocks working with the inclines of said drain floor and the frame A and the frame B to provide means with which to adjust the relative position of said processing tool to said chuck face and to facilitate the clamping of the frame A and the frame B to said base, means for adjusting the working surface of the processing tool in relation to the workpiece as regards the amount of material to be removed from said workpiece and to also keep said quill from rotating, means for feeding said workpieces to the working surface of the processing tool so the rate of said feeding is adjustable, a cam ring fixed to said chuck for automatically increasing the feeding rate when the processing tool is not being applied to a workpiece, means for automatically clearing all workpieces from the overlap of the processing tool and then stopping the operation of said processing tool and feeding means, means for controlling the distance workpieces will travel on said chuck before the operation of the processing tool and feeding means are automatically stopped so a partial chuckload of workpieces will not have to travel an undue distance to become processed, means for removing said chuck, cam ring, and gear as a unit from said tubular shaft and permitting the mounting on the tubular shaft of chucks that are similar with the aforementioned chuck.

6. The combination of a chuck mounted for rotation about an axis upon a stationary tubular shaft, said chuck having a face that has a series of recesses for gripping workpieces, an area on the face of said chuck void of said gripping recesses, a solenoid valve to turn on and off a condition of vacuum at said recesses, a spindle mounted for rotation in a quill, a frame A for mounting said tubular shaft to a base, said base including a deck and an inclined drain floor, a frame B for mounting said quill to the base so the quill is longitudinally slidable in said frame B, means for positioning and clamping the frame A and the frame B to the base so that a circular shaped processing tool mounted on said spindle will rotate in a plane substantially overlapping and parallel to the plane of rotation of said chuck face, said positioning and clamping means including dual wedge blocks working in conjunction with the inclines of said drain floor and the frame A and frame B to provide means with which to adjust the relative positions of said processing tool to said chuck face and to facilitate the clamping of the frame A and the frame B to said base, a rotatable screw mounted to said frame B, said screw engaging an arm that is fixed to said quill in order to prevent the quill from rotating and to provide means for adjusting the relation of the working surface of said processing tool to the workpiece as regards the amount of material to be removed from said workpiece, a gear fixed to said chuck engageable with a gear train, an adjustable speed gearmotor working in conjunction with said gear train and thereby providing means for adjusting the feeding rate of the workpieces to the working surface of the processing tool, a cam ring fixed to said chuck for periodically increasing the speed of said gearmotor when the processing tool is not being applied to a workpiece and said cam ring also providing means for automatically clearing all workpieces from the overlap of the processing tool, a cam disc for automatically stopping the operation of said processing tool and gearmotor when said workpieces are cleared of said processing tool and when the void area on the chuck face is evenly overlapped by said processing tool thereby facilitating the loading and unloading of the chuck with workpieces, means for disengaging said chuck from the geartrain in order to position the chuck prior to processing a partial chuckload of workpieces so said workpieces will not have to travel an undue distance in order to be processed, means for removing said chuck, cam ring and gear as a unit from said tubular shaft permitting the mounting on the tubular shaft of chucks that are similar to the aforementioned chuck and thereby providing means for processing a wide variety of workpiece types, means for remotely housing the controls associated with the operation of said processing tool, gearmotor, and solenoid valve and with said housing having a control panel located between means for holding reference workpieces that are mounted upon glass slides, a transparent shield with a double folding door enclosing said processing tool and the chuck and permitting the processing tool and gearmotor to operate only when said door is closed.

7. The combination of a chuck mounted for rotation about an axis upon a stationary tubular shaft, said chuck having a face that has a series of recesses for gripping workpieces, an area on the chuck face void of said gripping recesses, means to vacuumize said recesses, a spindle mounted for rotation in a quill, a frame A for mounting the tubular shaft to a base, said base comprising a deck and an inclined drain floor, a frame B for mounting said quill to said base so the quill is longitudinally slidable in said frame B, means for mounting the frame A and the frame B to said base so that a processing tool mounted on said spindle will rotate in a plane overlapping and substantially parallel to the plane of rotation of the chuck face, said mounting means including wedge blocks working in conjunction with the inclines of said drain floor and the frame A and the frame B to provide means with which to adjust the relative position of said processing tool to said chuck face and to facilitate the clamping of the frame A and the frame B to said base, means for adjusting the working surface of the processing tool as regards its relation to the workpiece and to also prevent said quill from rotating, means for feeding the workpieces to the working surface of the processing tool so the rate of feed is adjustable, a cam ring fixed to said chuck for periodically increasing the said rate of feed when the processing tool is not being applied to a workpiece, said cam ring also providing means for automatically clearing a chuckload of workpieces or any part thereof from the overlap of said processing tool, means for automatically stopping the operation of said processing tool and said feeding means when all processed workpieces have been cleared of said processing tool.

8. The apparatus defined in claim 7 including means for adjusting prior to processing a partial chuckload of workpieces the distance said workpieces will travel before the operation of said processing tool and feeding means are automatically stopped whereby the workpieces will not have to travel an undue distance to become processed.

9. The apparatus defined in claim 7 including means for removing said chuck, cam ring, and gear as a unit from said tubular shaft and permitting the mounting on said tubular shaft of chucks that are similar with the aforementioned chuck except for the configuration of said recesses and cam ring and thereby providing means for processing a wide variety of workpiece types.

10. The apparatus defined in claim 7, the means for vacuumizing the said recesses comprising vacuum grooves on the face of said chuck within the perimeter of said recesses, ports connecting said grooves to passageways which pass within the chuck to said tubular shaft, a groove extending around the full circumference of the tubular shaft, said groove located on the tubular shaft so it matches with said passageways, ports connecting said grooves to the bore of said tubular shaft, a tube connecting said tubular shaft to a solenoid valve and a tube connecting said solenoid valve to a vacuum source, said solenoid valve providing means for turning on and off a condition of vacuum at said recesses.

11. The apparatus defined in claim 7 including means for remotely housing the controls associated with the operation of said processing tool, gearmotor, solenoid valve and pump, and with said housing having a control panel located between means for holding reference workpieces that are mounted on glass slides.

12. Apparatus for processing rock material into thin section analysis specimens, said apparatus comprising a chuck mounted for rotation about an axis upon a stationary tubular shaft, said chuck having a face that has a series of recesses for gripping specimens that are mounted on glass slides, an area on the face of said chuck void of said gripping recesses, a solenoid valve to turn on and off a condition of vacuum at said recesses, a spindle mounted for rotation in a quill, a frame A for mounting said tubular shaft to a base, said base comprising a deck and inclined drain floor, a frame B for mounting the quill to said base so said quill is longitudinally slidable in said frame B, means for positioning and clamping the frame A and the frame B to said base so that a circular shaped processing tool mounted upon said spindle will rotate in a plane overlapping and substantially parallel to the plane of rotation of said chuck face, said positioning and clamping means including dual wedge blocks working in conjunction with the inclines of said drain floor and the frame A and the frame B in order to adjust the relative position of said processing tool to said chuck face and to facilitate the clamping of the frame A and the frame B to said base, a rotatable screw mounted to said frame B, said screw engaging an arm that is fixed to said quill in order to prevent said quill from rotating and to provide means for adjusting the relation of the working surface of said processing tool to the specimen as regards the amount of material to be removed from said specimen, a gear fixed to said chuck engageable with a geartrain, an adjustable speed gearmotor working in conjunction with said geartrain and thereby providing means for adjusting the feeding rate of the specimens to the working surface of the processing tool, a cam ring fixed to said chuck for periodically increasing the speed of said gearmotor when the processing tool is not being applied to a specimen, said cam ring also providing means for automatically clearing all said specimens from the overlap of the processing tool, a cam disc for automatically stopping the operation of said processing tool and gearmotor when said specimens are cleared and when the void area on the chuck face is evenly overlapped by said processing tool thereby facilitating the loading and unloading of said chuck with specimens, means for disengaging said chuck from the geartrain in order to position the chuck prior to processing a partial chuckload of specimens so said specimens will not have to travel an undue distance in order to become processed, means for remotely housing the controls associated with the operation of said processing tool, gearmotor and solenoid valve and with said housing having a control panel located between means for holding reference specimens that are mounted upon glass slides, a transparent shield having a double folding door, said shield enclosing said processing tool and the chuck and permitting the processing tool and gearmotor to operate only when said door is closed.

13. In an apparatus of the character described for processing solid material into precise cross-sections, means for loading said apparatus with one or more workpieces, means for adjusting and setting said apparatus so it will automatically apply a circular shaped processing tool to said workpieces, said apparatus comprising a chuck mounted for rotation about an axis upon a stationary tubular shaft, said chuck having a face that has a series of recesses for gripping said workpieces, an area on said chuck face void of said gripping recesses, means to vacuumize said recesses, a spindle mounted for rotation in a longitudinally movable quill, means for coupling said spindle to a longitudinally stationary motor shaft, said processing tool mounted upon said spindle so the processing tool will rotate in a plane overlapping and substantially parallel to the plane of rotation of said chuck face, means for mounting said tubular shaft and said quill to a base that has a deck and an inclined drain floor, a pair of wedge blocks working in conjunction with the inclines of said drain floor to provide means with which to adjust the relative position of said processing tool to said chuck face, means for adjusting said processing tool in regard to the amount of material to be removed from said workpieces, means for automatically feeding said workpieces to the processing tool, said feeding means being adjustable regarding the rate of feed, means for automatically increasing the said rate of feed when the processing tool is not being applied to a workpiece, means for automatically clearing all said workpieces from the overlap of said processing tool, means for automatically stopping the operation of said apparatus when a chuckload of processed workpieces is cleared and when the said void area on the face of the chuck is evenly overlapped by the processing tool.

References Cited by the Examiner

UNITED STATES PATENTS

| 1,263,057 | 4/1918 | Griffin | 51—131 X |
| 1,655,099 | 1/1928 | Hulse | 51—131 X |

FOREIGN PATENTS

| 956,758 | 4/1964 | Great Britain. |

HAROLD D. WHITEHEAD, *Primary Examiner.*